United States Patent

Hargis et al.

Patent Number: 5,558,325
Date of Patent: Sep. 24, 1996

[54] PLAY BALLS OR PRESSURELESS TENNIS BALLS

[75] Inventors: I. Glen Hargis, Tallmadge; Richard A. Miranda, Berlin Center; John A. Wilson, Akron; Oon H. Yeoh, Hudson, all of Ohio

[73] Assignee: GenCorp Inc., Fairlawn, Ohio

[21] Appl. No.: 102,686

[22] Filed: Aug. 5, 1993

[51] Int. Cl.$^6$ .............................. B32B 1/08; A63B 39/00
[52] U.S. Cl. .................... 273/61 C; 273/DIG. 4; 273/DIG. 5; 273/58 B; 273/61 R; 273/58 J; 428/36.4; 428/35.7; 428/36.8
[58] Field of Search .................... 428/35.7, 36.4, 428/36.8; 273/58 B, 58 J, 61 R, 61 C, DIG. 4, DIG. 5

[56] References Cited

U.S. PATENT DOCUMENTS

| | | | |
|---|---|---|---|
| 1,994,731 | 3/1935 | Sebrell et al. | 18/53 |
| 2,896,949 | 7/1959 | Dunker | 273/61 |
| 3,060,989 | 10/1962 | Railsback et al. | 752/330 |
| 3,239,228 | 3/1966 | Crompton, III | 273/218 |
| 3,241,834 | 3/1966 | Stingley | 273/58 |
| 3,310,508 | 3/1967 | Roy | 260/5 |
| 3,388,083 | 6/1968 | Kwok | 260/17.4 |
| 3,428,314 | 2/1969 | Haines et al. | 273/61 |
| 3,428,315 | 2/1969 | Haines | 273/61 |
| 3,539,475 | 11/1970 | Yoskioka et al. | 260/4 |
| 3,697,364 | 10/1972 | Boustany et al. | 161/59 |
| 3,709,845 | 1/1973 | Boustany et al. | 260/17.4 |
| 3,878,153 | 4/1975 | Driscoll | 260/29.7 |
| 3,943,079 | 3/1976 | Hamed | 260/17.4 |
| 4,022,469 | 5/1977 | Lacoste et al. | 273/61 |
| 4,145,045 | 3/1979 | Pocklington | 260/17.4 |
| 4,244,847 | 1/1981 | Posiviata et al. | 260/17.4 |
| 4,248,743 | 2/1981 | Goettler | 260/17.4 |
| 4,249,730 | 2/1981 | Frisk | 273/61 |
| 4,263,184 | 4/1981 | Leo et al. | 260/17.4 |
| 4,468,496 | 8/1984 | Takeuchi et al. | 525/233 |
| 4,543,377 | 9/1985 | Crossman | 524/13 |
| 4,580,781 | 4/1986 | Horiuchi et al. | 273/61 |
| 4,592,550 | 6/1986 | Horiuchi | 273/61 |
| 4,626,568 | 12/1986 | Sato et al. | 524/526 |
| 4,947,466 | 8/1990 | Horiuchi et al. | 273/61 |
| 5,150,905 | 11/1992 | Yuki et al. | 273/218 |
| 5,209,471 | 5/1993 | Horiuchi et al. | 273/61 C |
| 5,225,258 | 7/1993 | Nakamara et al. | 428/368 |

FOREIGN PATENT DOCUMENTS

| | | |
|---|---|---|
| 0456036A1 | 11/1991 | European Pat. Off. . |
| 0459436A1 | 12/1991 | European Pat. Off. . |
| 0512488A1 | 11/1992 | European Pat. Off. . |
| 4236402 | 4/1993 | Germany . |
| 1111135 | 4/1968 | United Kingdom . |
| 2163437 | 2/1986 | United Kingdom . |

OTHER PUBLICATIONS

European Search Report EP 94 30 5731 dated Dec. 1, 1994.
An article entitled "Composition and Cure Behaviour of Skim Block Natural Rubber," *Rubber Developments*, vol. 44, No. 1, pp. 21–30, Malaysian Rubber Research and Development Baord: Hertford, England, 1991.
An article entitled "Properties of Black–Loaded Vulcanizates of Skim Block Natural Rubber," *Rubber Developments*, vol. 45, No. 1, pp. 20–31, Malaysian Rubber Research and Development Board: Hertford, England, 1992.
An article entitled "Dicumyl Peroxide–Modified Cellulose/LLDPE Composites," *Journal of Applied Polymer Science*, vol. 41, pp. 2039–2048, John Wiley & Sons, New York, 1990.

*Primary Examiner*—Paul Thibodeau
*Assistant Examiner*—Mary Critharis
*Attorney, Agent, or Firm*—Robert F. Rywalski; Samuel B. Laferty

[57] ABSTRACT

A hollow rubber play ball is disclosed that uses a combination two or more fillers to produce desirable playing properties in a tennis ball as specified by the International Lawn Tennis Federation (ITF). The preferred play ball is a pressureless tennis ball. The specific fillers disclosed are mineral type particulate reinforcing fillers such as silicas and carbon black, polymeric fillers such as cellulose, a reaction product of grafting polyethylene with cellulose, and ethylene-vinyl acetate copolymers. These fillers can also have surface treatments to enhance the elastomer-filler interaction. Another reinforcing filler that can be introduced with the rubber components is the non-rubber constituents in skim rubber that serve to increase the modulus of a compounded rubber.

19 Claims, No Drawings

PLAY BALLS OR PRESSURELESS TENNIS BALLS

FIELD OF INVENTION

Rubber-based hollow balls are disclosed which are particularly designed for use as tennis balls but may be modified to serve as game balls for a variety of games. These balls contain gases at from atmospheric pressure to about 2 or 3 atmospheres. These balls use a combination of two or more reinforcing agents to achieve necessary ball stiffness, elasticity, and durability characteristics. One reinforcing filler is a high surface area mineral type filler such as silica or carbon black. A second reinforcing filler is short fibers such as cellulose. A third reinforcing filler is ethylene polymers or copolymers of ethylene with other monomers such as vinyl acetate. A fourth reinforcing filler is the non-rubber constituents found in skim rubber. The effectiveness of the reinforcing agents may also be enhanced by surface treatments of the reinforcing filler or grafting of the reinforcing filler to polyethylene.

BACKGROUND

Gas filled rubber play balls for tennis and other games are well known. They contain gases at atmospheric pressure or at elevated pressures. Tennis balls filled with compressed gases are preferred by many players due to their perceived playing properties. Typically, the balls start out with gases at pressures of 10 psi (0.7 kg f/cm$^2$, 0:069 MPa) above atmospheric pressure and then lose pressure during storage and use. The loss of pressure causes the playing characteristics of the ball to change.

An alternative to pressurized balls are balls with an internal pressure near atmospheric pressure. These are known as pressureless balls. To get playing characteristics similar to a pressurized ball, pressureless balls tend to have thicker walls than pressurized balls. To maintain the same ball weight with thicker walls, the density of the rubber compound in the wall needs to be lower.

Prior art patents substituted thermoplastic polymeric fillers, such as polystyrene, for mineral type fillers due to the lower density of thermoplastics than the many mineral type fillers. The high melting temperatures of these thermoplastics require an extra processing step where the thermoplastics were blended with the elastomer and dispersed at the higher temperature where the thermoplastic softens.

A problem with many rubber ball compounds is the tendency of the ball to soften (the modulus of the cured ball decreases) as a result of the repeated deformation during play. This changes the play characteristics of the ball. A reduced tendency to soften is clearly an advantage.

SUMMARY OF THE INVENTION

Hollow rubber play balls are disclosed that use combinations of reinforcing fillers to achieve the desired combination of dimensions, weight, resilience and ball deflection characteristics with the advantages of greater durability, improved resistance to softening during play and improved processability during fabrication. Reinforcing fillers used in various combinations are fine particle mineral type reinforcing fillers such as silica and/or carbon black, cellulose fibers, polyethylene, or copolymers of ethylene vinyl acetate (EVA). An advantage of the ethylene-vinyl acetate filler is that an extra step of removing the rubber compound from the mixer and cooling to a temperature lower than the activation temperature for the cure accelerators is not needed during the compounding of the rubber. The polyethylene homopolymer is desirably grafted to the cellulose fibers. The reinforcing fillers can optionally have surface treatments to enhance the elastomer-filler interactions. The substitution of skim rubber for a portion of natural rubber can increase the modulus and decrease the need for reinforcing fillers.

DETAILED DESCRIPTION OF THE INVENTION

The play balls of this invention are made by molding a compounded rubber blend. Molding can be accomplished by any conventional means such as compression, injection, transfer molding, etc. The balls are traditionally made as two hemispheres which are then adhesively joined to form a hollow sphere. They can optionally be formed with an internal gas under a pressure from about 6 to about 30 psig (0.04 to 0.2 MPa) above atmospheric pressure. The preferred ball has an internal pressure from −3 or 0 to about 5 psig (−0.02 or 0 to 0.034 MPa) above atmospheric pressure. Subsequently, it may be covered with a traditional felt material to reduce wear and provide desirable play characteristics to the tennis ball.

The compounding can be performed on a two roll mill, Banbury, or other elastomer mixing equipment. The compounded elastomer can be comprised of elastomeric rubbers; reinforcing mineral type fillers; other fillers; curatives, such as sulfur along with primary and secondary cure accelerators; processing aids; colorants; and protectorants.

The preferred play ball is a tennis ball meeting the specifications of the International Lawn Tennis Federation (ITF) which are:

1. Diameter 2.575–2.700 in. (65.4–68.6 mm)
2. Weight 2–2¹⁄₁₆ oz. (56.70–58.47 g)
3. Rebound from 100 in. (2.54 m) onto concrete, 53–58 in. (1.35–1.47 m)
4. (a) Forward Deflection under 18 lbf net (8.2 kgf) load: 0,220–0.290 in. (5.59–7.37 mm).
   (b) Reverse deflection under 18 lbf net (8.2 kgf) load on recovery after the ball has been compressed through 1 in., (25.4 mm): 0.350–0.425 in. (8.89–10.8 mm).

These deflections, which are ascertained with the aid of a special Stevens machine, provide more precise information on the behavior of the ball which results from the mechanical deflection thereof caused by the racket.

The details of the deflection tests carried out with the Stevens machine are as follows:

Prior to deflection measurements, tennis balls are preconditioned by compressing the balls to 25.4 mm (1 inch) deflection on each of the three orthogonal axes (x, y, z). All subsequent deflections are also measured along the three orthogonal directions.

In the first test to determine the deflection of the ball from rest (forward deformation or "forward deflection"), the tennis ball is compressed at a rate of 50.8 mm/min (2 inches/min) until a load of 1.36 kg (3 lbs.) is achieved, then the load is increased to 9.53 kg (21 lbs) providing a net load of 8.17 kg (18 lbs) and the resultant deflection is measured from the deflection at 1.36 kg load. The average forward deflection may be from 5.59 to 7.37 mm (0.22 to 0.29 ins) (Earlier tolerances were from 6.73 to 7.37 mm). In a second test the deflection of the ball after a preliminary compression is measured. First, the tennis ball is compressed with such force, while maintaining specific conditions, that the deflection is 25.4 mm (1 inch). Then the load is reduced to 9.53 kg (21 lbs.) and the deflection is measured. Then the load is reduced to 1.36 kg (3 lbs) and the deflection is measured again. The reverse deflection is the difference in displacement of the ball at 9.53 kg load and the displacement at 1.36 kg load. The displacement at 1.36 kg load is thus used as either a starting point or ending point for most displacement measurements by difference. The average deflection that now results is greater on account of the greater previous compression of 25.4 mm (1 inch) which the ball is recovering from. This is called "reverse deflection" and, according to the regulations, must be between 8.89 and 10.8 mm (0.35 to 0.425 inch).

The elastomer portion of the ball is a highly resilient rubber. Rubber is used to mean polymers that have rubbery properties. These include flexibility of the polymer backbone at the use temperature and the capability of being crosslinked. The rubber can be at least one rubber and preferably blends of two or more rubbers. Preferred rubbers are polyisoprene types, polybutadiene (BR) of high 1,4-unit content, and skim rubber. Other diene containing polymers and copolymers such as styrene-butadiene rubbers can be incorporated. The diene based copolymers can also be random copolymers, block copolymers, thermoplastic elastomers, graft copolymers, star polymers. All the other compounding components will be per 100 parts by weight of the rubber (elastomer), abbreviated phr. The molecular weights of the rubbers are desirably from about 50,000 to 500,000 or more.

The polyisoprene is desirably some form of natural rubber (NR) and/or synthetic high 1,4 content polyisoprene (i.e., >90%, desirably >95% 1,4-units and preferably about 100% cis 1,4 units). It is desirable as an option to include up to 100 phr, desirably up to 40 or 60, and preferably from 2 or 5 to 30 phr of skim rubber in the polyisoprene.

Skim rubber is a material which results from the production of natural rubber latex concentrate by centrifugation. After the centrifugation process, some 5–10% of the total rubber, together with an enhanced proportion of the non-rubber constituents of the original latex, remain in the serum phase. Coagulation of the solids in the serum phase by appropriate methods then gives "skim rubber." Analyses indicate skim rubber can contain a hydrocarbon/rubber content of 75–85 wt. %, a protein content of 9.8–15.6 wt. %, a fatty acid content of 1.5–5.3 wt. %, acetone extractables besides fatty acids of 3–5 wt. %, and an ash content of 0.3–0.5 wt. %.

The polybutadiene has desirably at least 75 or 80%, preferably at least 98% of 1,4 units and desirably these are cis-1,4 units. Desirably, the 1,2 vinyl units are less than 20 or 25%, and preferably less than 18%. The weight ratio of polyisoprene to polybutadiene is desirably from 100:0 to 0:100, desirably from 20:80 to 80:20, and preferably from 30:70 to 70:30, and most preferably from 50:50 to 65:35. Desirably, the 100 parts by weight rubber will be at least 90 wt. % and preferably 100 wt. % of said polyisoprene type rubber, said polybutadiene rubbers, and said skim rubber.

The fine particle size mineral type reinforcing fillers include silica and carbon black. These fillers can be distinguished from the polymeric fillers because the mineral type fillers have specific gravities of 1.2 and above and desirably from 1.6 to 2.0. Polymeric type fillers have specific gravities of 1.05 or less. Due to the tendency of carbon black to contaminate and discolor surrounding work areas, silica is preferred. The fine particle reinforcing fillers can be used individually or as a blend at levels up to 40 phr, desirably 1 to 30 phr, and preferably from 5 to 20 phr. The silica is desirably precipitated silica having median ultimate particle sizes of from about 0.01 to about 0.1, desirably from 0.02 to about 0.08, and preferably from 0.02 to about 0.04 µm. During precipitation, these small particles aggregate into larger structures. Silicas include precipitated materials that are primarily $SiO_2$ but also include a blend of $SiO_2$ with metal oxides from aluminum and magnesium. Silicas of smaller particle size and higher structure are more effective at increasing modulus. The silicas may optionally be surface treated, in the absence or presence of the rubber, to enhance their interaction with the elastomer. Preferred surface treatments are mercaptosilanes having one or more hydrolyzable alkoxy groups on a silicon atom in the molecule, such as silanes of the structure $(RO)_3\text{-}Si\text{-}(CH_2)_n\text{-}S_4\text{-}(CH_2)_n\text{-}Si(OR)_3$ where n is from 1 to 5 and desirably n is 3, and R is a lower alkyl, $HS(CH_2)_3Si(OCH_3)_3$, or other silanes which are reactive both with the elastomers and the silica.

Carbon blacks useful in this invention have ASTM designations from N110 through N787. The smaller sized particles with higher structure are more reinforcing than the larger sized particles. The particle sizes can desirably range from 0.02 to about 0.10 µm.

Cellulose fibers with aspect ratios above 3 are desirable reinforcing agents. They may have a ribbon-shaped structure with an average thickness of 17 µm and an average length of from 290 µm to 760 µm. Cellulose with these dimensions as classified as fine, medium, and coarse. A preferred cellulose fiber is treated to aid dispersion with agents such as limestone or talc. One such product is CF Fibers from Custom Fibers International. Cellulose helps control ball rebound and forward deflection. It can be present up to about 30 phr, desirably from 1 to 25 phr, and preferably from about 10 to about 20 phr. The cellulose fibers can be surface treated with resorcinol/formaldehyde bonding agents (such as Cohedur RL, supplied by Bayer) or by grafting reactions with polyethylene in the presence of a free radical source or with other surface modification.

Another reinforcing filler is ethylene-vinyl acetate copolymers (EVA). These polymeric fillers are useful in that they have a lower specific gravity than the cured elastomer and give different physical properties to the ball than do either the cellulose fibers or the mineral type fine particle size reinforcing fillers. The EVA is a desirable filler because of good surface interaction with the elastomers. The term crystalline does not imply total crystallinity but rather that the copolymer has crystalline regions therein. It has a lower crystalline melting temperature than polyethylene and can be blended with rubbers at normal processing temperatures and does not require a premixing step with the rubbers at elevated temperatures.

EVA has been found to reduce ball softening based on laboratory tests. The EVA copolymer is desirably from about 1 to about 10, and preferably from about 2 to about 5 or 7 wt. % vinyl acetate and desirably from 90 to 99, and preferably from 93 or 95 to 98 wt. % polyethylene. The softening point of the EVA copolymers is desirably from about 80° to 120° C., preferably about 85° to 115° C., and more preferably from 87° to 104° C. The EVA polymer desirably has a molecular weight from about 50,000 to 2,000,000. The EVA copolymer can be used in the compound from about 1 to about 30 phr, desirably from 5 to 25 phr, and preferably from 10 to 20 phr.

In addition to EVA, an ethylene-acrylic acid copolymer with from 1 to 10 wt. % acrylic acid and from 90 to 99 wt. % ethylene can be incorporated from about 1 to about 5 phr. The molecular weight range for this polymer is the same as for the EVA.

As explained above, the use of thermoplastic ethylene vinyl acetate polymer avoids the mixing problems that occur with thermoplastics having higher melting temperatures or high Tg values. Since the EVA has a crystalline melting temperature, the polymer undergoes a dramatic change in modulus just above its melting point. Polyethylene and polymers high in styrene content need to be mixed with the rubbery polymers at a high temperature (such as above 115°, 120°, 130°, 140°, or 150° C.) to achieve a good dispersion. The accelerators used with the sulfur to cure the rubber are preferably not added to the rubbery polymers at these high temperatures as they can begin curing the rubbery polymers before molding. Rubber compounders are thus forced to use two or multiple pass mixing procedures when high temperatures are used for the initial mixing.

Two-pass mixing involves a first mixing operation (pass) at the recited higher temperatures where at least one of the rubbers and a thermoplastic are mixed, an intermediate cooling step (the rubbery compound can be sheeted off with a mill and cooled with air, water, or other heat transfer fluid), and a second mixing operation (pass) at a lower temperature during which heat sensitive components such as the accelerators are added. Therefore, it is desirable to exclude thermoplastic resins having a softening points that cannot be mixed in a single pass mix at temperatures of 120°, 125°, or 130° C. or less. Such desirably excluded resins are low density polyethylene, linear low density polyethylene, other polyethylenes, and polymers with high styrene content.

In one-pass mixing, all the components to the compounded rubber are added in a single pass through the internal mixer without interrupting the mix for a cooling step.

An internal mixer is comprised of an enclosed mixing chamber or one capable of enclosure having at least one rotating shaft. Said at least one shaft being capable of exerting localized high shear stress to the material and being capable of exerting localized lower shear (homogenizing action) to polymer blends. Examples of internal mixers include Banbury mixers, Bolling mixers and Shaw intermixers. These mixers are generally not capable of producing dramatic cooling rates during mixing operations. Consequently, cooling is usually accomplished on multiple roll mills.

One-pass mixing is possible with the EVA polymers of this invention. The low melt temperatures of EVA permit mixing them with the rubbers at temperatures sufficiently low (always at or below 120°, 125°, or 130° C.) where the addition of curatives (sulfur and accelerators) is possible without the danger of premature curing. A cooling step outside of the internal mixer is not necessary prior to adding the curatives. A second mixing operation in the internal mixer is not needed. This saves equipment time, operator time, and minimizes the chance of errors by eliminating a step. The use of prevulcanization inhibitors may allow higher mix temperatures for short periods of time after the accelerators are added. One such inhibitor is N-(cyclohexlthio) phthalimide also known as Santogard™ PVI.

Polyethylene, used as a reinforcing filler, can be prereacted with cellulose fibers in the presence of a free radical source, causing grafting of the polyethylene to the cellulose fibers. The ethylene polymers or copolymers desirably have melting temperatures from 104° C. to 190° C. The polyethylene desirably has a molecular weight from about 50,000 to about 2,000,000. The weight ratios of polyethylene to cellulose fibers can be from 90:10 to 10:90, desirably from 70:30 to 30:70, and preferably from 60:40 to 40:60. The free radical sources include peroxides such as those formed from alkyls, aromatics, or alkyl substituted aromatics with from 3 to 12 carbon atoms per organo group; peresters; azo initiators such as AIBN; percarbonate initiators; and similar compounds. These reactions are desirably conducted in high shear rubber or plastic mixing equipment above the melting temperature of polyethylene or desirably from about 90° C. to about 190° C. and more desirably from 100° C. to 130° C. for time periods desirably from about 3 to about 30, and preferably from about 10 to about 20 minutes. The amount of the reaction product of polyethylene grafted cellulose in the compounded rubber can be up to 50 phr, desirably from 5 to 40 phr, and preferably from 10 to 30 phr. The ethylene-acrylic acid copolymer previously described can also be used in combination with the polyethylene and cellulose graft.

The compounded elastomer can contain other fillers at concentrations desirably up to 30, more desirably up to 20, and preferably from 5 to 15 phr. These include magnesium carbonate, zinc carbonate, barium sulfate, clays, talcs, soapstone, aluminum trihydrate, calcium carbonate, and related fillers. These fillers can also be treated with various silanes and other coupling agents such as previously disclosed (sizes) to enhance the properties of the filled elastomer.

The curatives can include sulfur from 0.5 to 6 phr, desirably from 1 to 5 phr; primary accelerators from 1.5 to 4, desirably from 2 to 3 phr such as thiazoles or sulfenamides; and secondary accelerators from 0.1 to 4.0, desirably from 1 to 2 phr such as thiurams, dithiocarbamates, and guanidines. Alternatively to using one primary and one secondary accelerator, one could alter the amount and use either two primary or two secondary accelerators.

Zinc oxide and a fatty acid such as stearic acid are typically included in the compounded elastomer. These function to activate the cure and increase the extent of crosslink formation. The preferred fatty acids have from 10 to 25 carbon atoms.

The compounded elastomer is compounded according to traditional elastomer mixing techniques as set out in texts such as "Rubber Technology" 3rd Edition, edited by Maurice Morton, Van Nostrand Reinhold: New York, 1987, in chapter 2. The compounded elastomer is then usually extruded into pellets (plugs) of sufficient weight to produce a hemispherical shell that is ½ of a ball. Pellets can be compression molded in from about 2 to 5 minutes at from about 130° to 170° C. and desirably from 140° to 160° C. to form hollow hemispherical tennis ball halves. The cure time used for molding halves in the examples was determined using a curemeter. The examples used the cure time to get 90% of the maximum torque. The halves are then trimmed of the flash which holds the mat together and the edges are trimmed or buffed prior to adhesively joining the halves in a heated mold. The adhesive is generally rubber based and sulfur cured with one or more accelerators. The surface of the balls are then further buffed if a felt is to be applied. Adhesive is applied to the ball and/or the felt edges and backing of the felt before the felt and ball are adhesively joined. The felt typically has a dumbbell shape prior to application on the ball. Conventional tennis ball felts such as wool-nylon blends can be used.

The rubber compound and balls of this invention have utility as tennis balls, play balls (assorted games where the ball is tossed, bounced, and struck) and as an exercise ball (where it might be compressed or deformed as part of an exercise program).

In addition to meeting ITF specifications, a tennis ball should have a long life and consistent play behavior. Ball softening is an undesirable increase in the forward deflection of the cured ball with repeated deformation. A measure of ball softening that closely simulates repeatedly deforming a tennis ball with a tennis racquet is obtained with an air-powered cannon. The cannon propels balls at 80 ft./sec. against a stationary aluminum block. The test apparatus is loaded with 8 balls and those balls are impacted 300 times in 10 minutes or approximately 37.5 times per ball in a ten minute period. At 10-minute intervals of time (0–80 min.), the balls are removed, tested for forward deflection and returned to the tester. Small changes in the measured forward deflection after a number of impacts correlates strongly with balls having superior resistance to softening during on-court play. Both tennis ball centers, felt, and ball adhesives are factors affecting ball softening.

Adequate fatigue life is an obvious requirement of tennis balls even though it is not controlled by any regulation. Felt construction and interaction of ball cements with the rubber core and felt are known to greatly influence ball durability.

A durability apparatus was used to measure the average time-to-failure (ATF). Failure is typically a rupture or catastrophic failure in the core. The tester consists of an air-powered cannon which repeatedly impacts balls, against an aluminum block until a failure occurs. Eight balls are impacted successively 30 times per minute at an impact velocity average of 115 ft./sec. Testing of a given ball is stopped if the particular ball has not failed in 60 minutes. As a general rule, tennis balls with an ATF ≧18 minutes provide good durability in play.

EXAMPLES

The following examples illustrate how the reinforcing fillers of this invention can be combined to meet the ITF requirements and provide better durability and less ball softening.

TABLE I

Pressureless Tennis Ball Compound Based on Cellulose and Silica

| Material | phr |
|---|---|
| SMR-CV (NR) | 60 |
| Taktene 1220 (cis-BR) | 40 |
| Cellulose (CF-32500L)[a] | 10 |
| Silica (Ultracil VN3-SP) | 20 |
| ZnCO$_3$ | 5 |
| ZnO | 2 |
| Stearic Acid | 1.5 |
| MBTS[b] | 1.75 |
| DPG[c] | 1.60 |
| Sulfur | 4.25 |

[a] coarse grade cellulose (CF-32500L) produced by Custom Fibers International
[b] 2,2'-di-benzothiazole disulfide
[c] diphenylguanidine The finished ball properties of Ball No. 1 made with the recipe in Table I are shown in Table II. A finished ball for test purposes includes a rubber ball covered with a standard felt. For comparison purposes, ball properties are given for a competitive pressureless tennis ball (Ball No. 1C). It is seen there that all the ITF requirements can be met with reinforcing fillers of silica and cellulose. These desirable properties of ITF specifications are met without including thermoplastic resins such as polystyrene or polyethylene.

TABLE II

Finished Ball Properties* of Pressureless Tennis Ball No. 1 and a Competitive Ball

| Ball Property | ITF Spec. | Ball No. 1 | Competitive Ball No. 1C |
|---|---|---|---|
| Rebound (in.) | 53–58 | 53.0 (0.8) | 55.0 (0.7) |
| Forward Deflection (in.) | 0.220–0.290 | 0.232 (0.007) | 0.199 (0.01) |
| Reverse Deflection (in.) | 0.350–0.425 | 0.427 (0.008) | 0.357 (0.01) |
| Size (in.) | 2.575–2.700 | 2.61 (0.01) | 2.61 (0.008) |
| Weight (g) | 56.7–58.5 | 58.8 (0.7) | 57.4 (0.5) |
| ATF (min.) | None | 44 | 46 |

*Values in parentheses are standard deviation for the 8 balls tested.

Ball No. 2 in Tables III and IV shows the effect of cellulose modification on ball properties. A composite of cellulose fibers grafted with a commercial low density polyethylene (Escorene LDPE) was prepared by free radical reaction involving 50 g cellulose fibers, 50 g LDPE, and 0.2 g dicumyl peroxide in a Banbury. About 12 minutes of mixing time was required for complete dispersion and grafting with the cellulose fibers. The initial Banbury temperature was 38° C. while the final mix temperature was 177° C. A physical mixture of cellulose and LDPE was prepared similarly to the graft composite without the presence of dicumyl peroxide. This was used in comparative Ball 2R.

Pressureless tennis balls were fabricated from the rubber formulations shown in Table III. The cellulose fibers grafted with LDPE as described above were formulated into Ball No. 2. The results of ball property tests are shown with a comparative pressureless tennis ball (Ball No. 2R), based on a physical blend of LDPE and cellulose, and a competitive Ball No. 2C in Table IV.

TABLE III

Formulations of Pressureless Tennis Ball No. 2 and a Comparative Ball

| | phr | |
|---|---|---|
| Material | Ball No. 2 | Comparative Ball No. 2R |
| SMR-CV (NR) | 60 | 60 |
| Taktene 1220 (cis-BR) | 40 | 40 |
| Silica (Ultracil VN3-SP) | 10 | 10 |
| Cellulose/LDPE Graft | 30 | — |
| Cellulose/LDPE Mixture | — | 30 |
| ZnCO$_3$ | 5 | 5 |
| ZnO | 2 | 2 |
| Stearic Acid | 1.5 | 1.5 |
| MBTS | 2.13 | 2.13 |
| DPG | 1.60 | 1.60 |
| Sulfur | 4.75 | 4.75 |

TABLE IV

Finished Ball Properties

|  | Ball No. 2 | Comparative Ball No. 2R | Competitive Ball No. 2C |
|---|---|---|---|
| Cellulose Modification | Grafted LDPE and Cellulose | Blend of LDPE and Cellulose | — |
| Ball Property | | | |
| Rebound (in.) | 53.1 (0.5) | 53.9 (0.8) | 52.1 (0.6) |
| Forward Deflection (in.) | 0.214 (0.005) | 0.225 (0.005) | 0.248 (0.009) |
| Size (in.) | 2.630 (0.009) | 2.630 (0.007) | 2.640 (0.010) |
| Weight (g) | 58.2 (0.2) | 57.9 (0.5) | 58.4 (0.2) |
| ATF (min.) | 50 | 32 | 55 |
| Stress-Strain Property[a] ASTM D412-80 | | | |
| Modulus at 100% (psi) | 641 (8) | 559 (12) | 649 (26) |
| Tensile Strength (psi) | 1986 (230) | 1396 (129) | 2113 (114) |
| Elongation at Break | 376 (23) | 329 (13) | 323 (11) |

[a]measurements taken of the tennis ball center vulcanizates

The results shown in Table IV demonstrate the merit of modifying cellulose with LDPE in the presence of a free radical initiator. Particularly, a significant improvement in ball durability (during the air powered cannon average time-to-failure (ATF) test) was obtained while maintaining ball properties within or close to the realm of ITF specification. The ATF of Ball No. 2 is seen to be superior to the comparative Ball 2R and comparable to Competitive Ball No. 2C . Ball No. 2C is considered to have outstanding durability based on laboratory and play test data. Moreover, the stress-strain properties of Ball No. 2 of this invention are superior to the comparative Ball 2R and comparable to the Competitive Ball No. 2C. The high values of tensile strength and elongation at break are an indication of the toughness of the Ball 2 centers and can be a predictor of on-court durability.

The effect of adding EVA to a tennis ball formulation is shown by Ball No. 3. The filler system of Ball No. 3 is similar to that of Ball No. 1 in Table I with cellulose replaced by an ethylene vinyl acetate copolymer (EVA). The exact recipe is in Table VII. Accordingly, pressureless tennis balls were fabricated from the rubber formulation similar to Table I with 15 phr Escorene LD-302 (EVA, 3.5 wt. % vinyl acetate) substituted for 10 phr cellulose (CF-32500L) and 7.5 phr Nucap 200 (a mercaptosilane coated aluminum silicate) substituted for 5 phr ZnCO₃. As shown in Table V, standard ball properties are essentially the same for Ball No. 1 and Ball No. 3 using the EVA of this invention. An ATF value of 30 for Ball No. 3 is considered adequate for good durability for on-court play. The balls were tested for ball softening using the air powered cannon for 80 minutes using the 80 ft./sec. velocity. The smaller "Increase in Deflection" shown in Table V for Ball No. 3 indicates it has better ball softening resistance than Ball No. 1. This is attributed to the nature of the rubber filler interactions with EVA.

TABLE V

Finished Ball Properties of Ball Nos. 1 and 3

|  | Ball No. 1 | Ball No. 3 |
|---|---|---|
| Ball Property | | |
| Rebound (in.) | 53.0 | 53.7 |
| Forward Deflection (in.) | 0.232 | 0.238 |

TABLE V-continued

Finished Ball Properties of Ball Nos. 1 and 3

|  | Ball No. 1 | Ball No. 3 |
|---|---|---|
| Size (in.) | 2.61 | 2.63 |
| Weight (g) | 58.8 | 58.8 |
| ATF (min.) | 44 | 30 |
| Ball Softening Property | | |
| Initial Deflection (in.) | 0.243 | 0.231 |
| Final Deflection (in.) | 0.278 | 0.259 |
| Increase in Deflection (in.) after 80 minutes | 0.035 | 0.028 |

The data shown in Tables VI, VII, and VIII distinguish our invention from that of EP 0 459 436 A1. The distinction is based on the use of copolymers of ethylene and vinyl acetate which have markedly different physical properties than the polyethylenes of EP 0 459 436 A1. Physical properties are shown in Table VI. It will be demonstrated that when EVA copolymers are incorporated into tennis ball rubber compositions, the resulting balls retain their playing characteristics better than balls reinforced with polyethylene.

The formulation (Table VII) for Ball No. 3R is taken from Example 1 of EP 0 459 436 A1 with the use of a low density polyethylene (Escorene LD-138) as the polyethylene component. ZnCO₃ (10 phr) is incorporated to obtain ball weight consistent with ITF specifications. The Shore D hardness (52) and flexural rigidity (2915) of the LD-138 are within the ranges of the polyethylenes (A, B, C) disclosed in EP 0 459 436 A1, as shown in Table VI.

TABLE VI

| Material | Shore D Hardness | Flexural Rigidity (kg/cm²) |
|---|---|---|
| Polyethylenes (A, B, C) EP 0 459 436 A1 | 50–65 | 2200–6900 |
| LDPE (LD-138) | 50 | 2915 |
| EVA (LD-302) | 47 | 267 |

It can be readily seen that the flexural rigidity of the EVA copolymer is outside the ranges of the polyethylenes of EP 0 459 436 A1.

The properties of Ball No. 3 made using an EVA copolymer called LD-302, shown in Table VIII, has higher rebound and lower deflection than the reference Ball No. 3R made using polyethylene called LD-138. LD-302 is a copolymer of ethylene and vinyl acetate (EVA) having about 95–98% ethylene and 2–5 wt. % Vinyl acetate. It has a crystalline melting temperature (Tm) of about 87°–104° C. Of greater significance is the substantially lower extent of ball softening ("Increase in Deflection") for Ball No. 3 vs. Ball No. 3R (0.028 in. vs. 0.060 in.). This data predicts a superior resistance to change in performance (ball softening) during on-court play, which is a desirable performance characteristic of tennis balls.

TABLE VII

Formulations of Pressureless Tennis Balls 3 and 3R

| | phr | |
|---|---|---|
| Material | Ball No. 3 | Ball No. 3R[a] |
| SMR-CV (NR) | 60 | 60 |
| Taktene 1220 (cis-BR) | 40 | 40 |
| Escorene LD-302 (EVA)[b] | 15 | — |
| Escorene LD-138 (LDPE)[b] | — | 20 |
| Silica (HiSil 132) | 20 | — |
| NuCap ™ 200 | 7.5 | 0 |
| Kaolin Clay | 0 | 10 |
| ZnCO₃ | — | 10 |
| ZnO | 2 | 5 |
| Stearic Acid | 1.5 | 1 |
| TBBS[c] | 1.6 | — |
| MBTS | 1.1 | 1.5 |
| DPG | 1.6 | 1.0 |
| Sulfur | 4.75 | 3.5 |

[a]based on European Patent 0 459 436 A1
[b]flexural rigidity values (kg/cm$^2$):
LD-302 = 267
LD-138 = 2915
[c]N-t-butyl-2-benzothiazyl sulfenamide

TABLE VIII

Comparison of Ball Softening Properties of Ball No. 3 with Reference Ball No. 3R[a]

| | Ball No. 3 | Ball No. 3R[a] |
|---|---|---|
| Ball Property | | |
| Rebound (in.) | 53.7 | 51.0 |
| Forward Deflection (in.) | 0.238 | 0.282 |
| Weight (g) | 58.8 | 58.5 |
| Size (in.) | 2.630 | 2.643 |
| ATF (min.) | 30 | 35 |
| Ball Softening Property | | |
| Initial Deflection (in.) | 0.231 | 0.278 |
| Final Deflection (in.) | 0.259 | 0.338 |
| Increase in Deflection (in.)[b] after 80 minutes | 0.028 | 0.060 |

[a]based on European Patent 0 459 436 A1 (Example 1)
[b]lower number indicates greater resistance to softening The protein fraction in skim rubber is considered to provide the enhanced reinforcement characteristics to vulcanizates. The effectiveness of varying amounts of skim rubber for reducing forward deflection in pressureless tennis balls without a significant loss in rebound can be seen by the data (for pressureless tennis balls containing silica as the inorganic filler) in Table IX. In addition, skim rubber can decrease ball deflection without a substantial weight penalty associated with the use of fillers such as silicas which have high specific gravities.

The data in Table IX shows that tennis balls meeting ITF specifications can be formulated with fillers only of silica and the non-rubber constituents brought in to the blend with the skim rubber.

TABLE IX

Effect of Skim Rubber on Tennis Ball Properties

| Material | Rubber Formulation (phr) |
|---|---|
| Skim Rubber | Variable |
| SMR-CV (NR) | 60 - (phr, Skim) |
| Taktene 1220 (cis-BR) | 40 |
| Silica (Ultracil VN3-SP) | 25 |
| ZnCO₃ | 7 |
| ZnO | 2 |
| Stearic Acid | 1.5 |
| MBTS | 2.50 |
| DPG | 1.75 |
| Sulfur | 5.00 |

Ball Properties

| Ball No. | Skim Rubber (phr) | Deflection (in.) | Rebound (in.) | Weight (g) | Size (in.) |
|---|---|---|---|---|---|
| 4 | 0 | 0.293 (0.006) | 51.8 (0.5) | 59.0 (0.3) | 2.620 (0.011) |
| 5 | 12 | 0.261 (0.006) | 50.9 (0.3) | 58.9 (0.5) | 2.605 (0.009) |
| 6 | 21 | 0.258 (0.006) | 51.1 (0.5) | 58.7 (0.6) | 2.613 (0.010) |
| 7 | 30 | 0.230 (0.007) | 51.5 (0.6) | 59.2 (0.7) | 2.618 (0.010) |

*Values in parenthesis are standard deviation for the balls tested.

The data in Table X shows physical properties for Balls No. 8 and No. 8R. The recipe for Ball No. 8 and Ball No. 8R were similar to those in Table VII. Ball No. 8 substituted 20 phr skim NR and 40 phr SMR-GP (NR) and Ball No. 8R substituted 60 phr SMR-GP (NR) for 60 phr SMR-CV (NR) in Ball No. 3. SMR-GP is a less expensive grade of natural rubber than SMR-CV. Ball properties of pressureless tennis balls are compared in these compounds reinforced with EVA copolymer and silica. In Table X, the effect of replacing 33 wt. % of the natural rubber component (SMR-GP) with skim rubber in Ball No. 8 results in a reduction in forward deflection, as can be seen by comparing the data for Ball No. 8 versus Ball No. 8R. Ball No. 8R is a reference ball identical to Ball No. 8 but without skim rubber. It is important to note in Table X that the reduction in deflection occurs with an improvement in the resistance to ball softening (0.031 increase in deflection versus 0.041) without any significant change in rebound and average time-to-failure (ATF). Moreover, the substitution of skim rubber, a lower cost type of NR, for SMR grades results in a lower cost rubber compound.

TABLE X

Comparison of Ball Properties of Ball No. 8 with Reference Ball No. 8R

| | Ball No. 8 | Ball No. 8R |
|---|---|---|
| phr Skim Rubber | 20 | 0 |
| Ball Property | | |
| Rebound (in.) | 51.5 | 51.1 |

TABLE X-continued

Comparison of Ball Properties of Ball No. 8 with Reference Ball No. 8R

|  | Ball No. 8 | Ball No. 8R |
| --- | --- | --- |
| Forward Deflection (in.) | 0.215 | 0.274 |
| Weight (g) | 58.5 | 58.1 |
| Size (in.) | 2.63 | 2.64 |
| ATF (min.) | 57 | 60 |
| Ball Softening Property* |  |  |
| Initial Deflection (in.) | 0.210 | 0.269 |
| Final Deflection (in.) | 0.241 | 0.310 |
| Increase in Detection (in.) | 0.031 | 0.041 |

*Final deflection is after 80 minutes.

In the above examples, Ball No. 2 using blends of silica and the polyethylene grafted cellulose has enhanced durability over balls with polyethylene and cellulose. Ball No. 3 has shown that an EVA copolymer with silica contributes to less ball softening during play than polyethylene. Ball No. 8 has shown that skim rubber contributes to lower initial deflection without decreasing rebound and also results in less ball softening.

While in accordance with the Patent Statutes, the best mode and preferred embodiment has been set forth, the scope of the invention is not limited thereto, but rather by the scope of the attached claims.

What is claimed is:

1. A play ball comprising: a blend of at least
   a) one or more crosslinked rubbers,
   b) one or more reinforcing particulate fillers comprising silica or carbon black or combinations thereof, and
   c) a polymeric filler being an ethylene-vinyl acetate copolymer with from about 1 to 10 weight percent vinyl acetate and/or the reaction product of cellulose grafted with a low density polyethylene in the presence of a free-radical source,
   wherein said polymeric filler is blended into said one or more rubbers before they are crosslinked, and
   wherein said ball is in the form of a hollow sphere.

2. A play ball according to claim 1, wherein said polymeric filler is the reaction product of cellulose grafted with low density polyethylene in the presence of a free-radical source, wherein said reaction product is present in the amounts from 5 to 40 phr, said reaction product having a weight ratio of said low density polyethylene to cellulose of from 10:90 to 90:10.

3. A play ball according to claim 1, wherein said one or more crosslinked rubbers contain skim rubber in amounts from 5 to about 40 phr.

4. A play ball according to claim 2, wherein said cellulose has a ribbon structure and has a surface coating, and where the weight ratio of polyethylene to cellulose is from 70:30 to 30:70.

5. In a tennis ball comprising a hollow sphere which is comprised of a crosslinked blend of one or more rubbers and reinforcing filler, the improvement comprising the inclusion of a grafted product of the reaction of low density polyethylene with cellulose in the presence of a free-radical source and wherein said grafted reaction product is present in amounts from 10 to 50 phr.

6. In a tennis ball according to claim 5, comprising as said one or more rubbers, skim rubber.

7. In a tennis ball comprising a hollow sphere of a blend of one or more crosslinked rubbers and reinforcing fillers, the improvement wherein said fillers comprise in combination, an ethylene-vinyl acetate copolymer, having from about 1 to 10 weight percent vinyl acetate and from 90 to 99 weight percent ethylene, and a particulate reinforcing filler selected from carbon black or silica or combinations thereof which are blended into said one or more rubbers before they are crosslinked.

8. A play ball according to claim 6, wherein said one or more rubbers further include cis 1,4- polyisoprene and/or cis 1,4-polybutadiene, said reinforcing filler is one or more silicas, said silicas are present from 5 to 30 phr, said cellulose has a ribbon structure, and said cellulose is present from about 25 to about 50 phr.

9. A play ball according to claim 7, wherein the play ball optionally includes a felt cover, said play ball has an external diameter from 65.4 to 68.6 mm and a weight of 56.7 to 58.5 g, and said play ball has an internal pressure of from a negative 0.02 to a positive 0.034 MPa as measured from atmospheric pressure.

10. A play ball according to claim 9, including from about 5 to about 30 phr skim rubber.

11. In rubber ball halves including one or more rubbers, fillers, and curatives wherein the improvement comprises having from 5 to 50 phr 6f a filler, said filler being a reaction product of low density polyethylene, cellulose fiber, and a free radical initiator reacted at from about 90° to about 190° C. which forms cellulose grafted with said polyethylene.

12. A play ball according to claim 1, wherein
   said one or more reinforcing particulate fillers comprises silica present in amounts from 1 to 30 phr,
   said one or more rubbers or comprise 1,4-polybutadiene, 1,4-polyisoprene, or skim rubber or combinations there of;
   said play ball optionally has a felt cover; and
   said play ball has a diameter of from 65.4 to 68.6 mm, a weight of from 56.7 to 58.5g, and an internal pressure of from about negative 0.02 to positive 0.034 MPa as measured from atmospheric pressure.

13. A play ball comprising:
   a blend of
      (a) one or more crosslinked rubbers,
      (b) one or more reinforcing particulate fillers comprising silica or carbon black or combinations thereof, and
      (c) an ethylene-vinyl acetate copolymer comprising from about 1 to 10 weight percent vinyl acetate and from about 90 to 99 weight percent ethylene;
   wherein said ethylene-vinyl acetate copolymer is blended into said blend before said one or more rubbers are crosslinked, and
   wherein said ball is in the form of a hollow sphere.

14. A play ball according to claim 13, wherein said one or more particulate fillers comprises silica present in amounts from 5 to 30 phr, and wherein said one or more rubbers comprise polybutadiene with at least 75 percent 1,4 units, polyisoprene with at least 90 percent 1,4 units, skim rubber or combinations thereof.

15. A play ball according to claim 14, wherein the play ball optionally has a felt cover, wherein said play ball has a diameter of from 65.4 to 68.6 mm and a weight of from 56.7 to 58.5 g, and wherein the play ball has an internal pressure of from about a negative 0.02 to a positive 0,034 MPa as measured from atmospheric pressure.

16. A play ball according to claim 15, wherein said ethylene-vinyl acetate copolymer is present from about 5 to about 30 phr and consists essentially of from about 1 to 10 weight percent vinyl acetate and from 90 to 99 weight percent ethylene.

17. A play ball according to claim 13, further comprising skim rubber in amounts from 5 to 40 phr and wherein said ethylene-vinyl acetate copolymer is present from about 5 to about 30 phr.

18. A play ball according to claim 16, wherein said ethylene-vinyl acetate copolymer consists essentially of from about 2 to about 5 wt. % vinyl acetate and from 95 to 98 wt. % ethylene.

19. A play ball according to claim 18, wherein said silica has been treated with a mercaptosilane.

* * * * *